Alvin L. Ewing
INVENTOR
BY
ATTORNEY

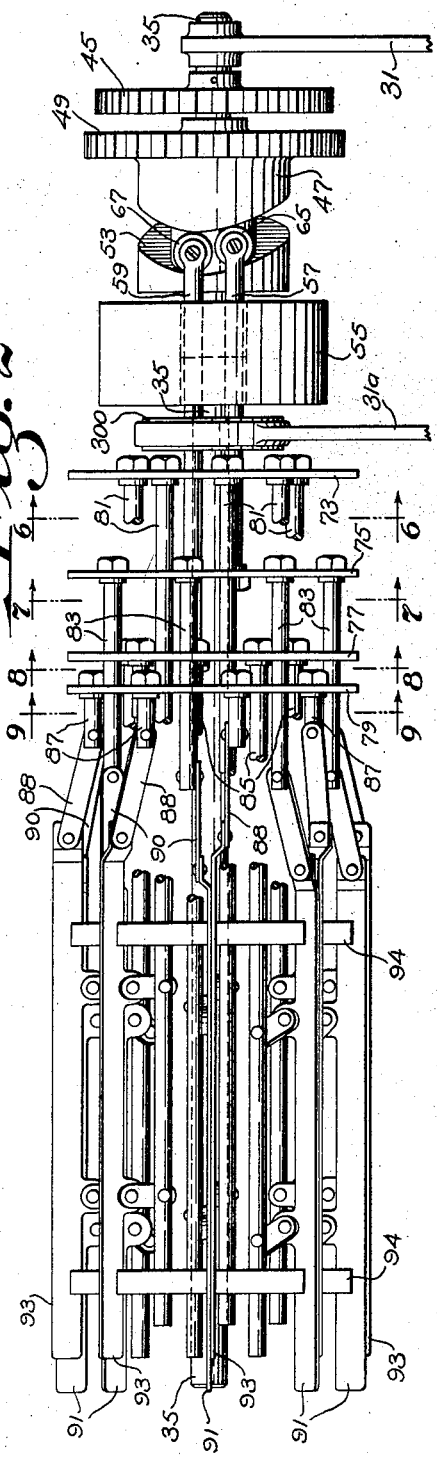

June 23, 1942.     A. L. EWING     2,287,517
YARN PROCESSING APPARATUS
Filed May 10, 1941     7 Sheets-Sheet 3

Alvin L. Ewing
INVENTOR
BY
ATTORNEY

June 23, 1942.  A. L. EWING  2,287,517

YARN PROCESSING APPARATUS

Filed May 10, 1941  7 Sheets-Sheet 4

Alvin L. Ewing
INVENTOR

BY
ATTORNEY

Alvin L. Ewing
INVENTOR

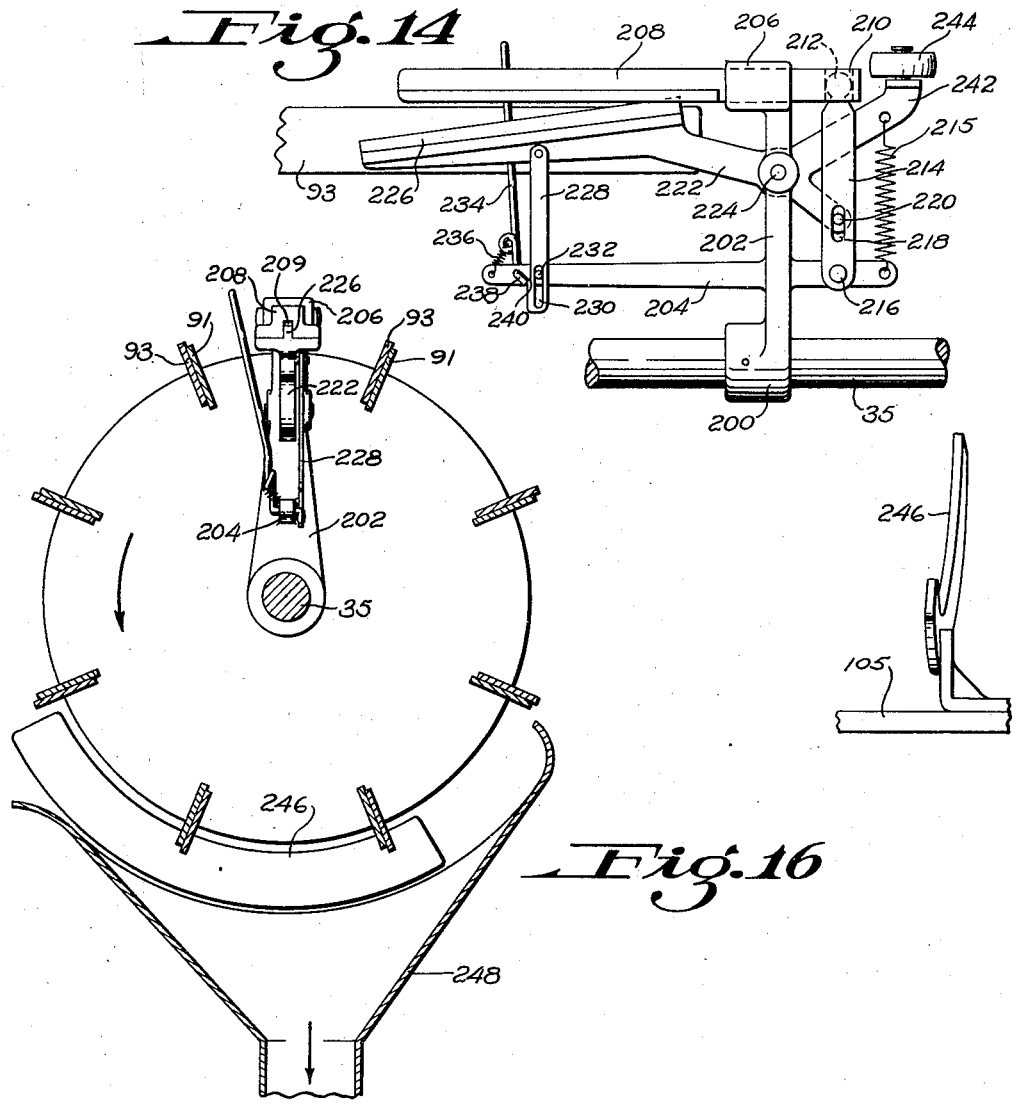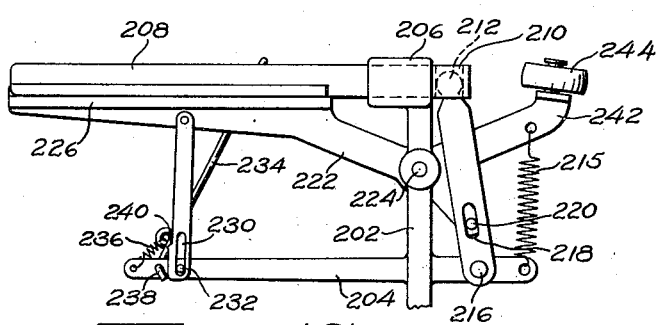

Fig. 18
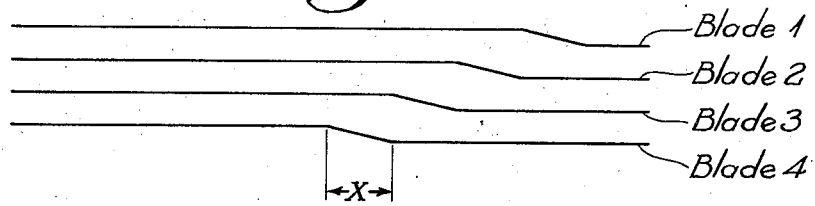
- Blade 1
- Blade 2
- Blade 3
- Blade 4
←X→
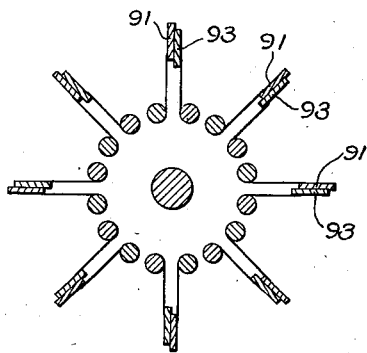
Fig. 19
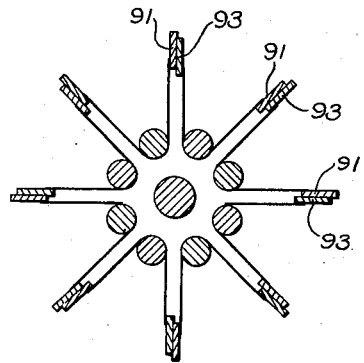
Fig. 20
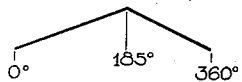
Fig. 21
0° 185° 360°
Fig. 22
0° 60° 120° 180° 240° 300° 360°
Fig. 23
0° 185° 200° 360°
Alvin L. Ewing
INVENTOR
BY *[signature]*
ATTORNEY Patented June 23, 1942

2,287,517

UNITED STATES PATENT OFFICE 2,287,517

YARN PROCESSING APPARATUS

Alvin L. Ewing, Richmond, Va., assignor to E. I. du Pont de Nemours & Company, Wilmington, Del., a corporation of Delaware Application May 10, 1941, Serial No. 392,873

18 Claims. (Cl. 242—53)

This invention relates to yarn processing apparatus. More particularly, it relates to a continuously rotating yarn storing and advancing reel.

Continuously operating yarn storing and advancing reels have been known heretofore, for example, the reels disclosed in United States Patents Nos. 1,938,221 and 2,210,914. Such reels are customarily used in the liquid treatment and drying of yarns in so-called "continuous spinning processes," i. e., processes in which the yarn is spun from a filament-forming solution, subjected to a liquid purification treatment, dried, and wound in a salable package in a continuous operation.

The continuously operating yarn storing and advancing reels known heretofore were not entirely satisfactory in their operation, for example, by reason of rapid wear, inefficient thread advance, variation in tension on the yarn, limitation to length of reel, high maintenance cost, etc.

It is, therefore, an object of the present invention to provide a yarn storing and advancing reel of improved construction which will overcome some of the objectionable characteristics of previously known reels of this type.

It is a further object of this invention to provide a yarn storing and advancing reel with a yarn severing mechanism which is automatically operated by the advancing yarn.

Other objects of the invention will appear hereinafter.

These objects are accomplished, in general, by the use of a reel in which yarn advancing is effected by means of longitudinally and radially moving blades acted upon by a cam system which controls the longitudinal and radial motion of the blades so that, as the reel is rotated, the blades continuously and smoothly advance the yarn along its length.

The present invention will be more easily understood by reference to the following detailed description when taken in connection with the accompanying illustrations, in which:

Figure 2 is a side elevational view, with certain parts cut away, of the thread advancing mechanism shown in Figure 1.

Figure 3 is a side elevational view, similar to Figure 2 but with the cam turned 180° from the position of the cam in Figure 2.

Figure 14 is a side elevational view, with parts broken away, of the yarn actuated yarn severing means of the present invention.

Figure 15 is a side elevational view of the means shown in Figure 14 with the severing knives in operative position.

Figure 16 is an end elevational view of the means shown in Figure 14.

Figure 18 is a diagrammatic illustration of a modified form of construction of thread advancing members.

Figure 19 is a sectional view of a modified form of mounting of yarn advancing members.

Figure 20 is a sectional view of still another modified form of mounting of yarn advancing members.

Figures 21, 22, and 23 are diagrammatic development views of alternate forms of cam grooves.

Figure 1:
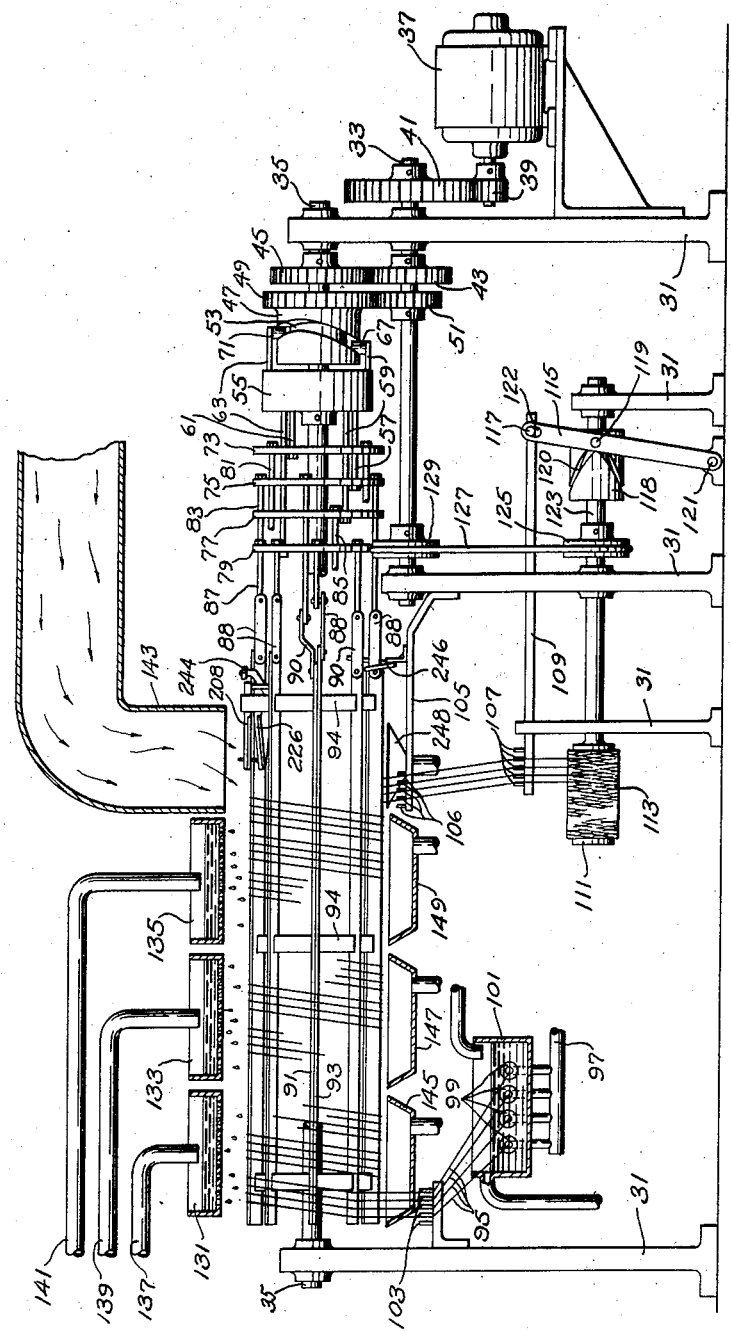
Figure 1 is a side elevational view, with parts shown in section, of a thread storing and advancing reel constructed in accordance with the present invention.

Referring now to Figure 1, reference numeral 31 designates the main frame of yarn storing and advancing apparatus. A counter shaft 33 is journaled in two uprights of the frame 31. A drive motor 37 is also mounted on said frame. A pinion gear 39 is positioned on the motor shaft to drive gear 41 fixed on one end of counter shaft 33. A main reel drive shaft 35 is also journaled in two upright members of frame 31. The shaft 35 is driven from counter shaft 33 by means of gears 43 and 45 fixed on said shafts. A cam 47 is rotatably mounted on shaft 35 and is fixed to gear 49. The latter is driven by gear 51 fixed on shaft 33. The cam drive gear ratio is different, (preferably lower, as shown,) from the drive gear ratio of the shaft 35. By rotation of the counter shaft, therefore, the main shaft 35 is rotated at a faster rotational speed than the cam 47 and gear 49.

Four draw rods 57, 59, 61 and 63 are connected respectively to cam followers 65, 67, 69 and 71. The cam followers are positioned in two oppositely disposed pairs (69, 71 and 65, 67) in cam groove 53. The draw rods 57, 59, 61 and 63 are positioned in a guide block 55, which is fixed to shaft 35, and rotate therewith. As the draw rods are rotated with the guide block 55, they maintain the followers in the above-said paired relationship in the cam groove 53.

The opposite ends of draw rods 57, 59, 61 and 63 are connected respectively to header disks 75, 77, 73 and 79. The header disks are centered on drive shaft 35 and are reciprocated along said shaft by the respective draw rods.

Each of the header disks is connected to a plurality of blade actuator bars. Disk 75 is connected to a plurality of blade actuator bars 83 (eight as shown). Disk 77 is connected to blade actuator bars 85; disk 73 to blade actuator bars 81; and disk 79 to blade actuator bars 87. The blade actuator bars will, of course, be reciprocated by the header disks.

A plurality of pairs of yarn advancing blades 91, 93 (eight pairs as shown) is circumferentially arranged about the drive shaft 35. The pairs of blades 91, 93 are positioned in spaced slots in the guide disks 94, and are supported and radially and longitudinally reciprocated by the blade actuator bars 81, 83, 85, and 87. The actuator bars, guide disks and blades are rotated as a unit with the drive shaft 35.

A plurality of separate yarns 95 is spun by passing a filament-forming solution from conduit 97 through spinnerets 99 and into the coagulating bath in trough 101. The yarns are passed from the coagulating bath around fixed guide pins 103, and thence about the yarn advancing blades. The pins 103 function to maintain the yarns separated from each other on the advancing blades. As the yarn is advanced it is treated with liquids from perforated pans 131, 133 and 135 which are supplied by the respective conduits 137, 139 and 141. The treating liquid as it drips from the yarn and reel is caught in the respective catch pans 145, 147 and 149. The advancing yarn next passes under a hot air blower 143 where it is suitably dried.

The yarn ends must be fastened to the yarn reel, for example, by entangling the yarn ends with the succeeding yarn helices, when the operation is first started in order to cause the yarn ends to continue to rotate with the reel. Consequently, the yarn will advance helically in a right-hand direction as viewed in the drawings and will eventually pass between knife blades 208 and 226 which will automatically sever the yarn as set forth in detail below. The knife blades, which rotate with the yarn advancing blades will forward the yarn ends to suction funnel 248. The suction funnel 248 will continue to draw the continuous yarns thereinto without further contact with the knife blades. The separate, individual yarns may now be passed between the pins 106 of the pin bracket 105, thence between pins 107 of traverse arm 109 and finally about rotating bobbin 111 to form a yarn package 113.

The bobbin 111 is rotated by means of counter shaft 123 which is journaled in the frame 31. The counter shaft 123 is driven by means of belt 127 and pulleys 125 and 129 positioned respectively on counter shafts 123 and 33. Counter shaft 123 is also provided with a cylinder cam 118. A cam follower fixed on lever 115 is positioned in the cam groove 120. One end of the lever 115 is pivoted to a fixed base at 121. The lever 115 is, therefore, caused to oscillate by the rotating cylindrical cam 118. The other end of lever 115 is provided with a slot 122. A pin 117 positioned on traverse bar 109 projects through the slot 122. The traverse bar, which is slidably positioned in two spaced openings in the frame 31 is thus caused to reciprocate by the oscillating lever 115.

Figure 10:
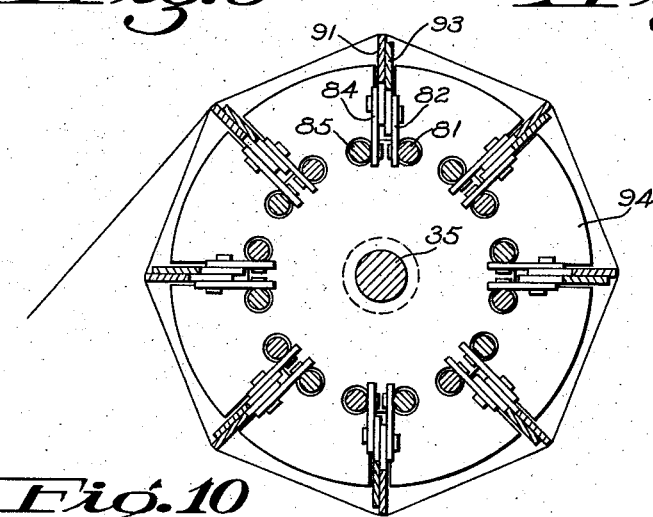
Figure 10 is a sectional view taken along the line 10—10 of Figure 3.

Referring now to Figures 2 to 10 inclusive, the details of construction and actuation of the yarn advancing blades will be more clearly set forth. As above stated the sixteen yarn advancing blades shown are arranged in eight pairs of blades 91 and 93. All of the blades 93 are connected at their ends, by means of connecting links 88 to blade actuating bars 87 to be reciprocated thereby longitudinally of shaft 35. All of the blades 91 are similarly connected at their ends by means of connecting links 90 to blade actuating bars 83 to similarly reciprocate longitudinally of shaft 35. The reciprocating blade actuating bars 81 and 85 are positioned substantially along the full length of the blades, and are supported in guide disks 94 as shown in Figures 2, 3 and 10. Bars 81 are positioned radially inwardly of blades 93, and bars 85 are positioned radially inwardly of blades 91. All of the blades 93 are connected to their respective bars 81 by means of two short links 82, and blades 91 are similarly connected to bars 85 by links 84 (see Figures 4, 5 and 10). The reciprocation of bars 81 and 85 relative to bars 83 and 87, therefore, imparts a radial reciprocation of the blades linked thereto. Figures 6 to 9 inclusive show the relative arrangement of the blade actuator bars 81, 83, 85 and 87, as well as the draw rods 57, 59, 61 and 63 in the header disks 73, 75, 77 and 79. The frame member 31a and the bearing 300 rotatable therein, shown in Figures 2 and 3, comprise an alternative supporting structure when it is desired to have a cantilever type support. In this case the drive shaft will not be supported at its end projecting from the blades.

Figure 11:
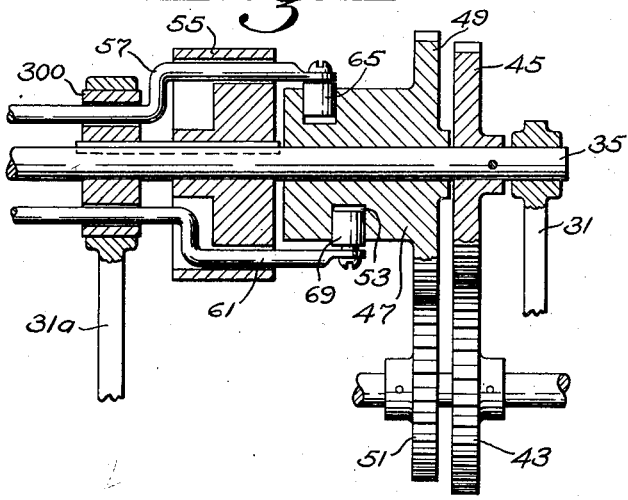
Figure 11 is a sectional view taken through the cam mechanism and showing the means of driving the thread advancing mechanism.
Figure 12:
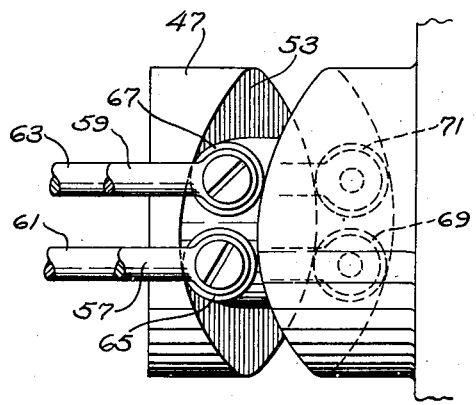
Figure 12 is a perspective view showing the details of construction of cam groove and cam followers.

Figures 11 and 12 show in cross-section and perspective the detail of the cam 47, cam groove 53, cam followers 65, 67, 69 and 71 and guide block 55. As shown in Figure 11, the guide block 55 is keyed to drive shaft 35 to rotate therewith. The draw rods, of which 57 and 61 are shown, are positioned in openings in the guide block 55 and rotate therewith thus causing the cam followers to move in the cam groove 53. As the followers move in the cam groove, the draw rods are caused to reciprocate. When a cantilever reel construction is desired, the bearing 300 is also keyed to shaft 35 and the bearing rotates within the inner circumferential surface of a suitable journal in support 31a as shown. As above stated, this is an alternative form of supporting structure and will be omitted when the shaft 35 is supported at its two extreme ends as shown in Figure 1. Figure 12 shows paired arrangement of the cam followers in the cam groove 53 as above referred to with reference to Figure 1.

The above-described mechanism operates as follows:

The motor 37 drives the counter shaft 33 through gears 39 and 41. The counter shaft drives the main reel shaft 35 through gears 43 and 45. The cam 47, which is rotatable about shaft 35, is independently driven from the counter shaft 33 through gears 51 and 49. Due to the lower gear ratio, the cam 47 is rotated at a lower rotational speed than drive shaft 35 thereby causing the cam followers to move in the cam groove 53, and thus, reciprocating the draw rods 57, 59, 61 and 63. The draw rods reciprocate the header disks 73, 75, 77 and 79, which in turn reciprocate the blade actuator bars 81, 83, 85 and 87. The actuator bars reciprocate the yarn advancing blades longitudinally and radially of the shaft 35 to steadily advance the yarn in helices about the blades.

Figure 4:
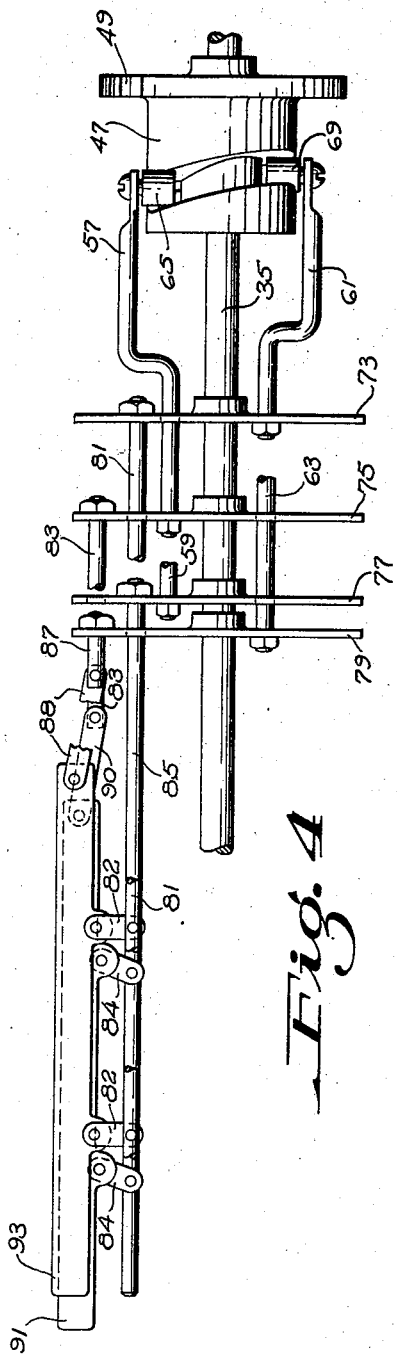
Figure 4 is a side elevational view of the thread advancing mechanism, with sufficient parts cut away to show the operating detail of a single pair of thread advancing members.
Figure 5:
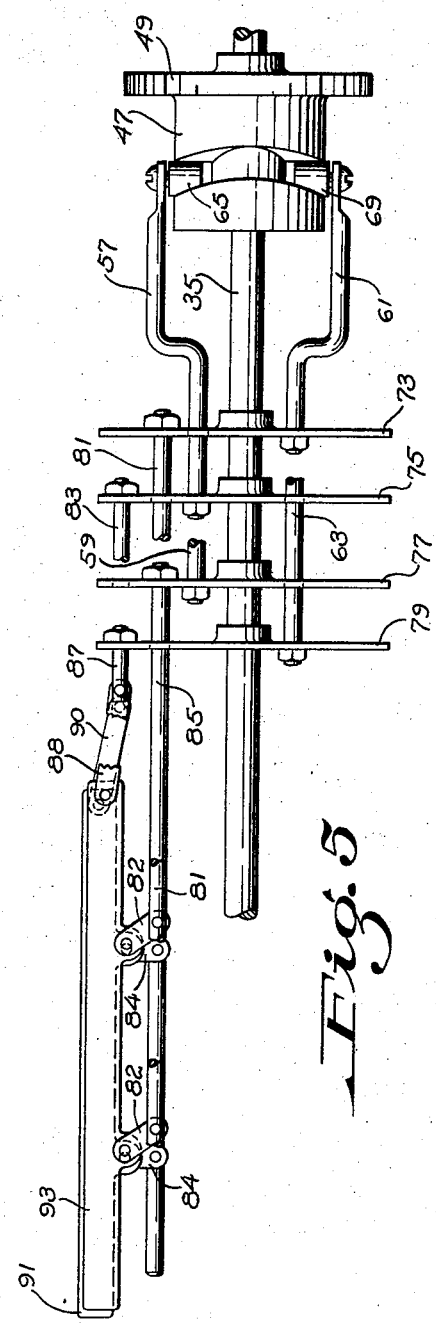
Figure 5 is a side elevational view similar to Figure 4 but with cam position advanced 90°.
Figure 6:
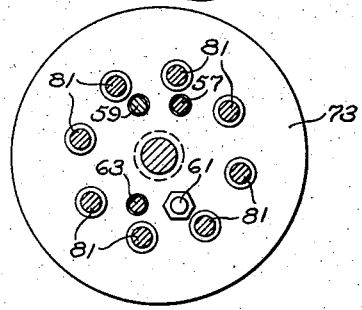
Figure 6 is a sectional view taken along the line 6—6 of Figure 2.
Figure 7:
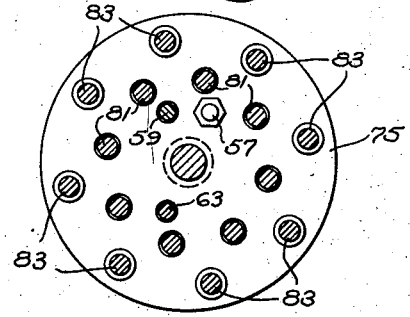
Figure 7 is a sectional view taken along the line 7—7 of Figure 2.
Figure 8:
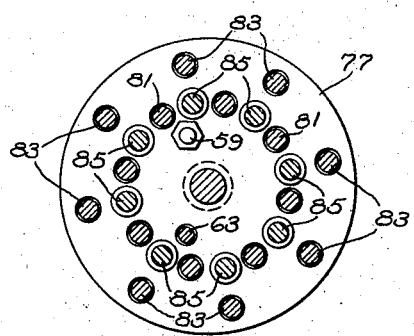
Figure 8 is a sectional view taken along the line 8—8 of Figure 2.
Figure 9:
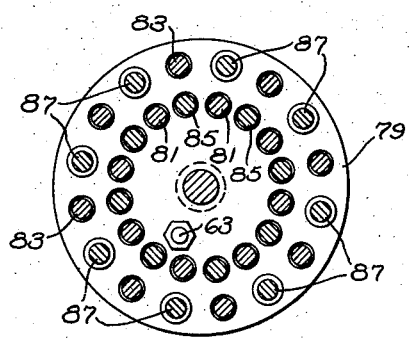
Figure 9 is a sectional view taken along the line 9—9 of Figure 2.

As the cam groove 53 just begins to move the cam follower 65 to the right (as viewed in the drawings), the follower 67 is still moving to the left (see Figure 12). Consequently, disk 75 and bars 83 will move to the right while disk 77 and bars 85 will still move a slight distance to the left before reversing direction and following disk 75 and bars 83 in the right-hand direction. This slight movement of bars 83 and 85 relative to each other will cause a straigtnening of the links 84 shown in Figure 4 to the position of these links shown in Figure 5. All the yarn advancing blades 91 will thereby be forced radially outward. At identically the same time, follower 71 will just begin to move to the left while follower 69 will still move a slight distance to the right and then follow the follower 69 to the left. Consequently, disk 79 and bars 87 will just begin to move to the left and disk 73 and bars 81 will move a slight distance to the right and then reversing direction follow disk 79 and bars 87 to the left. This slight relative movement between bars 87 and bars 81 will cause the links 82 to be moved from their vertical position as shown in Figure 4 to their angular position as shown in Figure 5. All the yarn advancing blades 93 will thereby be forced radially inward. Now, as the followers 65 and 67 continue to move together to the right, the blades 91 will be moved to the right with the links 84 in the vertical position shown in Figure 5. At the same time, the followers 71 and 69 will move together to the left and thereby move the blades 93 to the left with links 82 maintained in the angular position shown in Figure 5. After the followers have moved 180° in the cam groove, there will be a reversal in direction of followers to first move the respective links into the position shown in Figure 4 and then move the blades in the opposite direction with the links maintained in the position shown in Figure 4.

Figure 13:
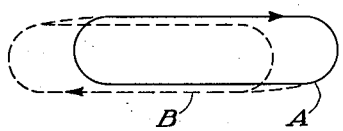
Figure 13 is a diagrammatic view showing the paths of movement of a yarn advancing member.

Figure 13 illustrates the continued cyclical movement of all the blades. First, they will move to the radially outward position shown by A, then to the right, then to the radially inward position, and then to the left. One of each pair of blades 91, 93 is always moving to the right and when moving in this direction, it is in the radially outward position and is therefore carrying the yarn. When moving back to its left-hand position, the blade will be in the radially inward position and out of contact of the yarn.

Obviously, the use of the terms "left" and "right", as used in the specification, is not limitative of the invention, but is merely illustrative to correspond with the form and construction of the apparatus specifically illustrated.

As the blades comprising the reel rotate about the shaft 35 and simultaneously reciprocate longitudinally and radially of the shaft 35, the yarn will be advanced in helices along the reel; as illustrated in Figure 1, the yarn moves left to right. The yarn, during its advancement along the reel, may be subjected to a series of liquid treatments, for example, a desulfuring treatment, a bleaching treatment, a washing treatment, treatment with a yarn finish or the like. The yarn is then dried by means of hot air, or the like, and then wound into salable packages. If desired, the yarn may be twisted in a known manner before being wound on to the package.

When the yarn ends are first brought in contact with the yarn advancing blades of the reel, they will be wrapped about the reel in such a manner that they will continue to rotate with the reel until they reach the other end of the latter. As the wrapped yarn ends approach the extreme end of the reel in their advancement, they will pass between the knives 208 and 226 of a yarn severing mechanism. The advancement of the yarn will automatically cause the knives to be actuated to sever the yarn and carry the same to the suction funnel 248 in a manner described below. The yarn will then automatically continue to pass to the funnel without being further severed. The individual yarns can then be threaded on to the bobbin 111 at the leisure of the operator.

The yarn severing and doffing mechanism is illustrated in Figures 14, 15 and 16 and comprises a supporting frame 200 fastened to drive shaft 35 to rotate therewith. The supporting frame comprises a rigid member 202 projecting radially from the shaft 35, a cross-bar 204 and a sleeve 206. A knife 208, provided with a shearing groove 209 on one end thereof, is slidably positioned in sleeve 206. The other end of the knife has a bore 210 into which is fitted the ball knuckle 212 on the projecting end of a pivoted member 214. Member 214 is pivoted at the other end to cross-bar 204 by a pivot pin 216. Member 214 is provided with a slot 218 in the body thereof. A pin 220 fastened to a projecting finger of the pivoted knife member 222 is positioned within slot 218. Knife member 222 is pivoted at 224 to member 202. Knife blade 226 is positioned on member 222 to engage knife blade 208. A latching member 228 is pivoted at one end to member 222 below the knife blade 226. The other end of latching member 228 is provided with a slot 230. A guide pin 232 fastened to cross-bar 204 projects through slot 230. A yarn actuated latch finger 234 projects through a small opening in cross-bar 204. One end 238 of latch finger 234 is bent to fit against shoulder 240 on latching member 228. A spring 236 is positioned between finger 234 and cross-bar 204 to force the end 238 of the finger against shoulder 240 when the knife is in the open position. The other end of finger 234 is positioned to project into the path of the advancing yarn helices. The opposite end of knife member 222 is provided with an extension 242 at the end of which is positioned a knife resetting button 244. A coil tension spring 215 is positioned between extension 242 and cross-bar 204. Spring 215 is adapted to force the two knife blades into shearing contact with each other upon actuation of latch finger 234. At the same time that the knife blade 226 is sprung outwardly into engagement with knife blade 208, the pivoted member 214 is swung to the left thereby sliding knife blade 208 to the left as the blades contact each other thereby to impart a double shearing action to the knife blades. It will be noted that the knife blades 226 and 208 comprise interengaging tongue and groove members (see Figure 16). On both sides of said tongue and groove members, the knives are provided with shoulders which hold the severed yarn ends, and by rotating with the shaft 35 forward the severed yarn to the suction funnel 248. When the yarn severing and doffing mechanism has rotated 180° from the position shown in Figure 16, the resetting button 244 contacts the resetting cam 246 to open and reset the knives, and to release the yarn ends to suction funnel 248. Upon resetting of the knife blades, the blade 208 will be retracted, due to the sliding motion imparted thereto. Knife blade 208 will, therefore, have no further contact or interference with the advancing yarn helices which are passing into suction funnel 248.

The severing and doffing mechanism operates as follows: The entire mechanism rotates with the reel. As the yarn gradually moves in helices toward the right, it will push the latch finger 234 to the right, against the action of spring 236, until latching elements 238 and 240 are released from each other. Main spring 215 will now force knife 226 against knife 208 while knife 208 is simultaneously moved longitudinally of knife 226 thereby shearing the yarn helices. The shoulders adjacent the tongue and groove sections of the knives hold the severed ends of the yarn and transfer the same to the suction funnel 248. When the severing device approaches the funnel the yarn is released and the knives reset by the coaction of the resetting button 244 and cam 246. The knives after being reset are automatically latched in position by latching elements 238 and 240 which are brought into engagement by means of spring 236.

The yarn, after being once severed and the ends transferred to the suction funnel 248, will continue to be drawn into the funnel without being further severed. The yarn ends can now be individually removed from the funnel and threaded between guides 106 and 107 and on to the take-up bobbin 111 at the convenience of the operator.

Figure 17:
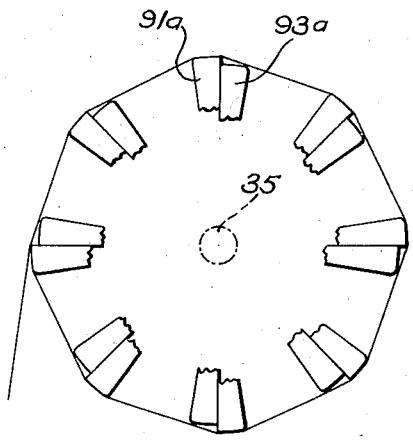
Figure 17 is an end elevational view of a modified form of yarn advancing members.

Figure 17 illustrates a reel comprising a slightly modified form of yarn advancing blades 91a and 93a. These blades are made thicker and provided with rounded edges to prevent any possible injury to the finest denier filaments.

Figure 18 illustrates a series of yarn advancing blades which are successively tapered along their lengths to allow for yarn shrinkage. The length of the taper "X" of each blade may be made equal to the length of the blade reciprocation stroke so that, in one reciprocation cycle, the yarn is moved over the tapered portion of only one, or possibly two blades. Such a gradual taper will assist in evening out tension variations along the reel due to progressive yarn shrinkage.

Figure 19 shows, diagrammatically, the blade movement construction and arrangement of the detailed apparatus above described.

Figure 20 discloses, in a similar fashion, a modified blade movement construction. In this modified construction, two blades are moved simultaneously in the same direction by a single blade actuating bar. By this general construction, the number of bars necessary to reciprocate the blade can be cut in half.

Numerous designs of cams may be used to carry out various types of reeling by the apparatus of this invention. In Figure 21 is shown the development of the cam illustrated in the example. It will be noted that this cam is slightly unsymmetrical in that the point of reversal is placed 185° beyond the other point of reversal instead of 180°. That is, the advancing section of the cam is 185° long and the retracting section is 175°. This development is made to insure the maintenance of the circumference of the reel; that is, it prevents the loss of circularity of the reel as the blades pass each other. If an unsymmetrical cam, such as this one is used, the effect will be, as can easily be seen by a study of the principles involved, that the yarn is carried on both blades for a short time. The length of this time depends on the amount by which the cam is unsymmetrical. The cam can be made even more unsymmetrical if desired. For example, if one leg of the cam track (the leg which is responsible for the advancing motion) is 260° long and the retracting leg of the cam is 100° long, both blades will be extended $13/18$ of the time. That is, the yarn will be carried by both blades for $13/18$ of the advancing stroke.

Other types of cam paths may be advantageously used for special circumstances. For example, in Figure 22 is shown the development of a cam having six legs instead of two of the example. If this type of cam is used with a reel employing four cam followers, as that shown in the example, the blades will go through three times as many cycles with a given gear ratio as they would with the two-legged type of cam. Or advantageously, the gearing may be changed to give the same number of cycles as would be provided by a two-legged cam and the cam may, thus, be run slower with attendant reduction of wear. With the type of cam of Figure 22, the number of cam followers and blades may be increased, thus giving greater support to the yarn. If a cam, whose development is shown in Figure 23, is used, certain advantages are obtained. It will easily be seen that with this type of cam the blades will collapse more quickly at the point of reversal. This will avoid drag on the yarn with attendant advantages.

The apparatus of this invention has been described in terms of a specific embodiment but it will be well understood that numerous modifications are possible within the scope of the invention. It is convenient to construct this reel so that the helical path of the yarn is 12 inches in diameter and the reel may be made conveniently about 10 feet long to take care of the necessary processing of viscose rayon yarn. However, the diameter of the reel may be made greater or less to suit particular circumstances and the length may be any convenient size. The amount of throw of the cam determines the length of each longitudinal stroke. A convenient size for this throw is one-half inch, but this may be made greater or less depending on circumstances. In general, as the number of yarn ends to be processed at a given time is increased, the throw of the cam should also be increased. Conveniently, 10 to 25 ends may be processed simultaneously, but it is quite possible within the scope of the invention to process any number from one up to whatever number can easily be handled by the collection means.

In the example illustrated, the treating liquid was applied to the yarn by means of a drip process. Sometimes it would be more advantageous to apply this treatment in the form of a spray or mist. It is of advantage so to space the adjacent turns of yarn that the processing liquids will form a continuous sheet of liquid by the operation of surface tension.

The parts of this apparatus may be made of any convenient material of construction to withstand the effect of the processing liquids, as well as the corrosive activity of the newly-coagulated yarn. Advantageously, the blades may be made in sections, each section being of a material of construction calculated to withstand best the processing treatment in that part of the reel. This reel has been shown to be constructed in such a manner that the driving end of the reel is at an end opposite that of the coagulating bath. This is advantageous since thus the acid coagulating bath is kept well away from the driving mechanism, but any other arrangement will operate satisfactorily. A convenient modification is to have the driving mechanism at the center and with a reel at each end, each reel being a complete processing unit. These reels may be of the cantilever variety so as to obtain the convenience of an open end. Thus, the newly-coagulated yarn will wind on to the reel at the end and will advance inwardly toward the drying means and the doffing arrangement.

In the apparatus shown, it was found convenient to use eight pairs of blades for carrying the yarn; however, this number may be changed to suit the necessities of any particular problem.

Two reels of different rates of advancement per revolution working in conjunction may be advantageously employed in accordance with this invention. These reels may be placed end to end so that the yarn will transfer automatically from one to another. The yarn may first be advanced and processed on the one of small advancement and then transferred to the one of larger advancement, to spread out the turns of yarn for any convenient purpose, such as drying.

The drying may be performed either by the use of a duct, as is shown in the drawing, or by enclosing the drying section of the reel with a heated chamber as shown in United States Patent No. 1,983,221. Another convenient method of drying is to employ a hollow shaft through which warm air is forced through perforations in the shaft at the drying section. Radial disks may be placed around the shaft at each end of the drying section to seal it off.

Although any convenient speed is operative with the apparatus of this invention, it is found that 3,000 inches per minute is a convenient rate of yarn travel for this apparatus.

Although this yarn storing, yarn advancing reel has been particularly described with reference to the production of viscose rayon yarn, its uses are not so limited. This reel can advantageously be used for any purpose where yarn storage concurrent with yarn advancement is of value. For example, this reel is found of utility in the evaporative spinning of cellulose derivative yarn. It is of value in the spinning of cellulose acetate yarn when placed directly beyond the spinning machine to store and advance yarn while the stored yarn is heated to remove the last traces of solvent. It is of use in any of the textile arts for the application of size to a yarn. It is of particular utility when it is wished to apply the size and then to allow the size to dry before it is wound up. This reel may also be used advantageously for the application of size to those types of yarn in which it is desired that the sized yarn be maintained in a moist condition for a considerable time before drying. Similarly, there are many places in the yarn art where considerable lengths of yarn need to be handled in a small space.

It will easily be seen that the use of a reel of this type presents considerable advantages over the prior art practice. The yarn, when passing along this reel, is subjected to the same tension throughout each revolution of the reel. Since the two sets of blades in this reel have a common center, wear will be uniform around its periphery and can be easily compensated for. It is easily possible, by substituting a cam of slightly different pitch, to change at will the spacing of the yarn on the reel. The spacing may also be changed by simple variations in the gear ratios.

It is also possible, by means of simple changes of gearing to adjust the reel for any desired spacing between adjacent turns of yarn and for any speed of advancement. However, one of the greatest advantages of the reel of this invention is that it may be made any convenient length and may, thus, be used to subject the yarn to any desired number of processing steps, any of which may be of any desired duration.

Since it is obvious that many changes and modifications can be made in the above-described details without departing from the nature and spirit of the invention, it is to be understood that the invention is not to be limited to the details described herein except as set forth in the appended claims.

I claim:

1. A yarn processing reel comprising two sets of yarn carrying bars, the bars of one of said sets disposed alternately between the bars of the other of said sets, the bars of said sets movable axially and radially relative to the other of said sets whereby to advance the yarn helically along the reel, a yarn severing mechanism positioned adjacent one end of said reel and an actuating means for said yarn severing mechanism, said actuating means positioned in the path of said helically advancing yarn whereby the advancing yarn will actuate said severing mechanism to sever one or more courses of the helically advancing yarn.

2. A yarn processing reel comprising two sets of yarn carrying bars, the bars of one of said sets disposed alternately between the bars of the other of said sets, the bars of said sets movable axially and radially relative to the other of said sets whereby to advance the yarn helically along the reel, a yarn severing mechanism positioned between yarn carrying bars adjacent one end of said reel and an actuating means for said yarn severing mechanism, said actuating means positioned in the path of said helically advancing yarn whereby the advancing yarn will actuate said severing mechanism to sever one or more courses of the helically advancing yarn.

3. A yarn processing reel comprising two sets of yarn carrying bars, the bars of one of said sets disposed alternately between the bars of the other of said sets, the bars of said sets movable axially and radially relative to the other of said sets whereby to advance the yarn helically along the reel, and a yarn actuated yarn severing mechanism positioned adjacent one end of said reel.

4. A yarn processing reel comprising two sets of yarn carrying bars, the bars of one of said sets disposed alternately between the bars of the other of said sets, the bars of said sets movable axially and radially relative to the other of said sets whereby to advance the yarn helically along the reel, a yarn severing mechanism fixed on one end of said reel, said mechanism including cooperating yarn severing elements, said severing elements positioned between yarn carrying bars and an actuating means for said yarn severing mechanism, said actuating means positioned in the path of said helically advancing yarn whereby the advancing yarn will actuate said severing mechanism to sever one or more courses of the helically advancing yarn.

5. A yarn processing reel as defined in claim 4 and comprising means for operating said yarn severing elements, said means actuated by the yarn advancing on said reel.

6. A thread processing reel comprising a plurality of pairs of thread carrying bars, means for rotating all of said bars as a unit about a common axis, a cylindrical grooved cam, a plurality of cam followers positioned in said cam groove, linkage means connecting one of each pair of thread carrying bars to one of said followers whereby to simultaneously reciprocate said bars axially of said common axis, linkage means connecting the same one of each pair of thread carrying bars to another of said followers whereby to simultaneously reciprocate said bars radially of said common axis, linkage means connecting the other of each pair of thread carrying bars to a third and fourth of said cam followers to simultaneously reciprocate said bars axially by one of said followers and radially by the other of said followers, said followers arranged in said cam groove to continually move one of each pair of bars in a direction opposite to the movement of the other of said bars.

7. A yarn processing reel as defined in claim 6 and comprising a reciprocable cross-head between each of said cam followers and one of each pair of thread carrying bars.

8. A thread processing reel as defined in claim 6 and in which each of said linkage means comprises a reciprocable cross-head connected to a cam follower and connected to one of each pair of thread carrying bars.

9. A thread processing reel as defined in claim 6 and in which each of said linkage means comprises a reciprocable cross-head connected by means of a bar to a cam follower and connected by means of a bar and a pivoted link to one of each pair of thread carrying bars.

10. A thread processing reel as defined in claim 6 and in which the slope of said cam groove is substantially constant whereby to impart substantially uniform speed reciprocating movements to said carrying bars.

11. A yarn processing reel comprising two sets of yarn carrying bars, means for rotating all of said bars as a unit about a common shaft, the bars of one of said sets disposed alternately between the bars of the other of said sets, the bars of said sets movable axially and radially relative to the other of said sets whereby to advance the yarn helically along the reel, a yarn severing mechanism, means for mounting said yarn severing mechanism on said common shaft, said yarn severing mechanism comprising cooperating yarn severing elements, said elements positioned between the said yarn carrying bars and an actuating means for said yarn severing mechanism, said actuating means positioned in the path of said helically advancing yarn whereby the advancing yarn will actuate said severing mechanism to sever one or more courses of the helically advancing yarn.

12. A yarn processing reel as defined in claim 11 in which one of said yarn severing elements is positioned on the outside of the helically advancing yarn and the other of said elements is positioned on the inside of the helically advancing yarn.

13. A yarn processing reel as defined in claim 11 in which one of said yarn severing elements is positioned on the outside of the helically advancing yarn and the other of said elements is positioned on the inside of the helically advancing yarn, and means for forcing said inside positioned element against said outside positioned element to sever said yarn.

14. A yarn processing reel as defined in claim 11 in which one of said yarn severing elements is positioned on the outside of the helically advancing yarn and the other of said elements is positioned on the inside of the helically advancing yarn, and spring means for forcing said inside positioned element against said outside positioned element to sever said yarn.

15. A yarn processing reel as defined in claim 11 in which one of said yarn severing elements is positioned on the outside of the helically advancing yarn and the other of said elements is positioned on the inside of the helically advancing yarn, spring means for forcing said inside positioned element against said outside positioned element to sever said yarn, and means for simultaneously moving said outside positioned element longitudinally of said other element whereby to impart a shearing cut to said severing elements.

16. A yarn processing reel as defined in claim 11 in which one of said yarn severing elements is positioned on the outside of the helically advancing yarn and the other of said elements is positioned on the inside of the helically advancing yarn, spring means tending to force said elements against each other, cooperating latching members for holding said severing elements in separated relationship, one of said cooperating latching members positioned in the path of said helically advancing yarn whereby said advancing yarn will unlatch said latching members to actuate said severing elements.

17. A yarn processing reel as defined in claim 11 in which one of said yarn severing elements is positioned on the outside of the helically advancing yarn and the other of said elements is positioned on the inside of the helically advancing yarn, spring means tending to force said elements against each other, cooperating latching members for holding said severing elements in separated relationship, one of said cooperating latching members positioned in the path of said helically advancing yarn whereby said advancing yarn will unlatch said latching members to actuate said severing elements, and means for relatching said latching members upon rotation of said reel.

18. A yarn processing reel as defined in claim 11 in which one of said yarn severing elements is positioned on the outside of the helically advancing yarn and the other of said elements is positioned on the inside of the helically advancing yarn, spring means tending to force said elements against each other, cooperating latching members for holding said severing elements in separated relationship, one of said cooperating latching members positioned in the path of said helically advancing yarn whereby said advancing yarn will unlatch said latching members to actuate said severing elements, and cam and cam follower means for relatching said latching members upon rotation of said reel.

ALVIN L. EWING.